Aug. 14, 1951　　　J. JOHNSON　　　2,564,206
OSCILLATING VANE MOTOR WITH LOCKING MEANS THEREFOR
Filed Oct. 7, 1946　　　4 Sheets-Sheet 1
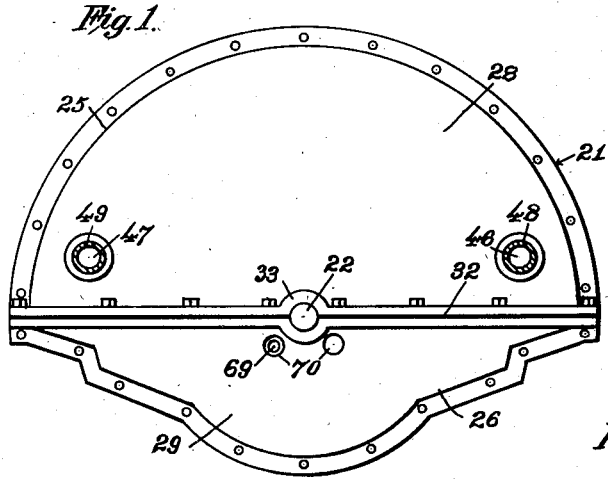
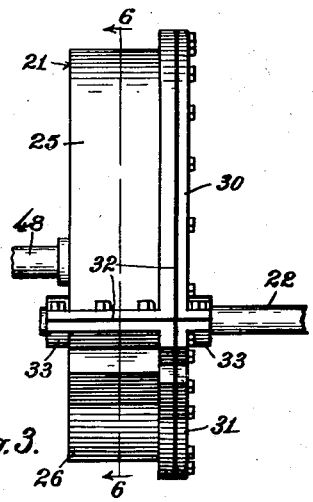
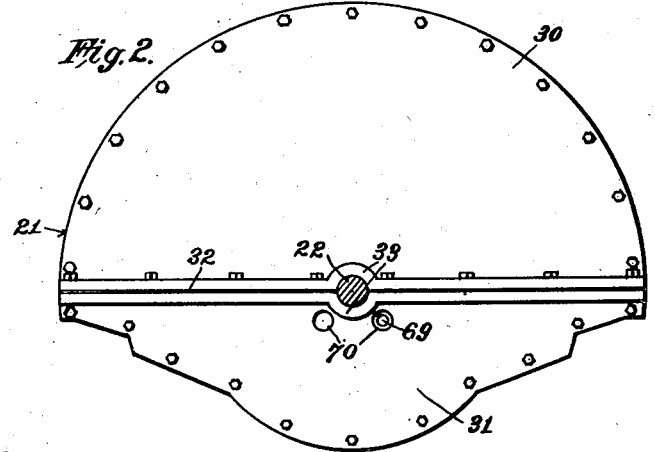
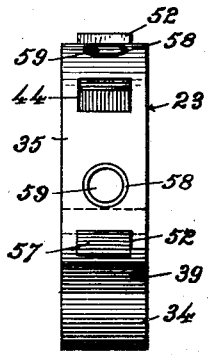
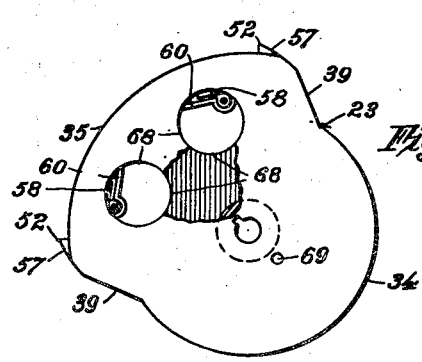
INVENTOR.
John Johnson Aug. 14, 1951  J. JOHNSON  2,564,206
OSCILLATING VANE MOTOR WITH LOCKING MEANS THEREFOR
Filed Oct. 7, 1946  4 Sheets-Sheet 2

INVENTOR.
John Johnson
BY

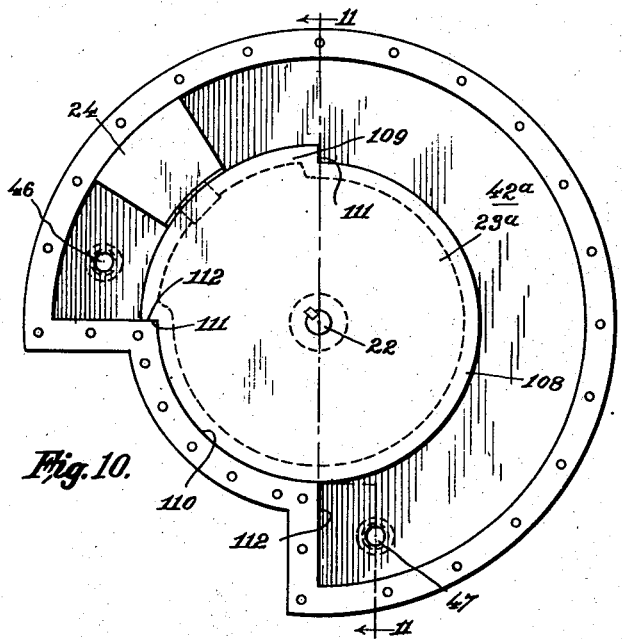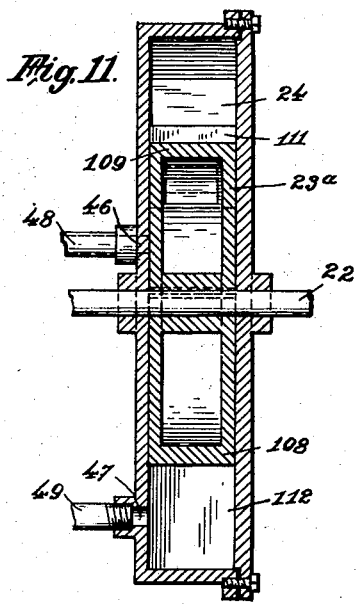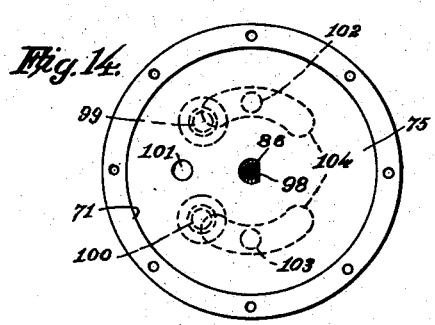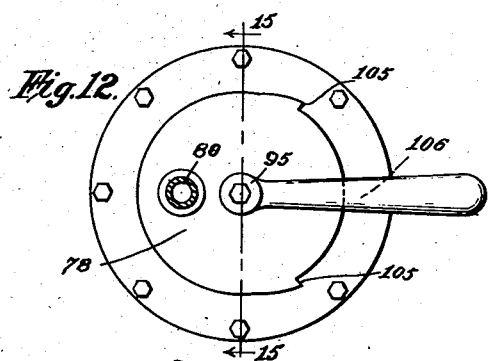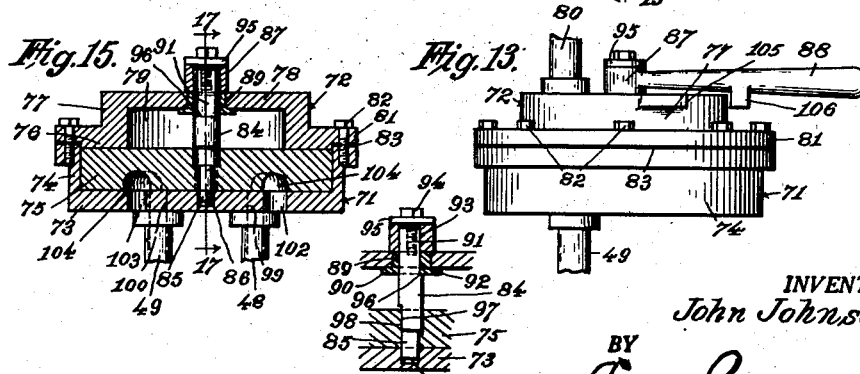

Aug. 14, 1951  J. JOHNSON  2,564,206
OSCILLATING VANE MOTOR WITH LOCKING MEANS THEREFOR
Filed Oct. 7, 1946  4 Sheets-Sheet 4
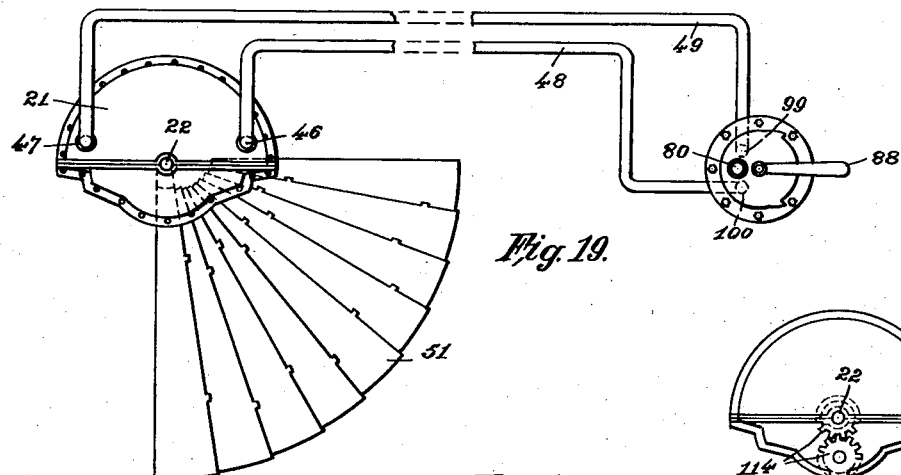
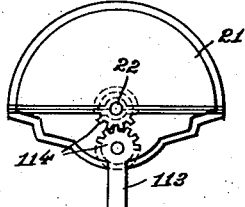
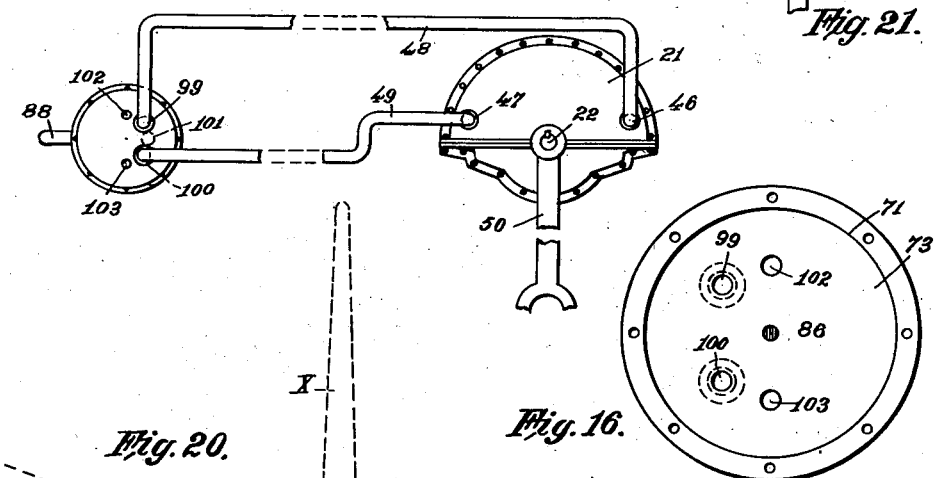
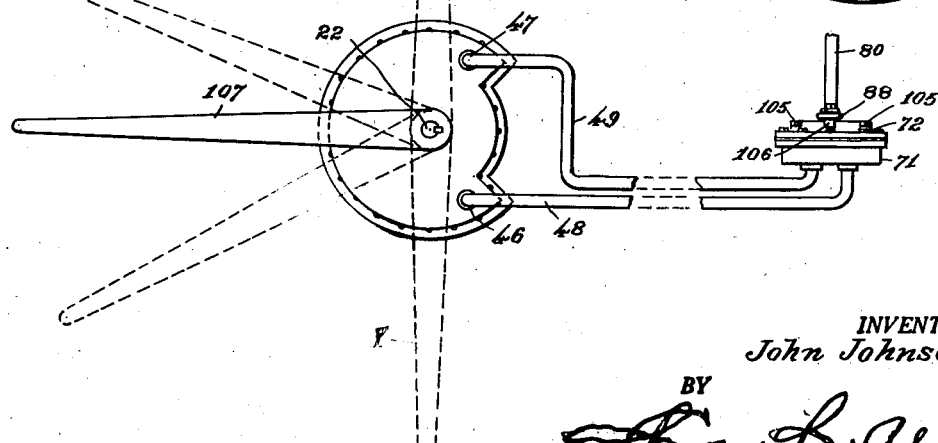
INVENTOR.
John Johnson
BY Patented Aug. 14, 1951

2,564,206

UNITED STATES PATENT OFFICE 2,564,206

OSCILLATING VANE MOTOR WITH LOCKING MEANS THEREFOR

John Johnson, Spokane, Wash.

Application October 7, 1946, Serial No. 701,683

7 Claims. (Cl. 121—40)

This invention relates to an improved pneumatic control system particularly adapted for actuating certain parts of an airplane such as the retractable landing gear, the elevators and rudder, and the collapsible elbows such as described in and forming a part of my copending application for patent on airplanes, filed April 10, 1946, Serial Number 661,173, now Patent No. 2,502,045, granted March 28, 1950.

The system includes generally an actuating device or motor comprising a housing, an oscillatory spider and vane therein, a shaft fixed to the spider and connected to the element to be actuated, together with means for supplying fluid under pressure to either side of said vane at the volition of the operator to move said element in the desired direction.

The object of the invention is to provide a device of the character stated which shall be of comparatively simple construction, and prompt and dependable in operation.

A further object of the invention is to provide a device as mentioned which will automatically lock the spider when it reaches the limit of movement in either direction so as to securely hold the actuated element in fixed position until it is desired to again shift the same.

A further object of the invention is to provide, in a device as mentioned, means actuated by the pressure build-up behind the vane, for automatically unlocking the rotor.

A further object of the invention is to provide a device of the class mentioned having an oscillatory spider for actuating shaft, in which but two ports are necessary, and means associated therewith whereby said ports may be selectively used as inlet and exhaust ports to cause the spider to move in either direction at the option of the operator.

Other objects will appear hereinafter.

Figure 6:
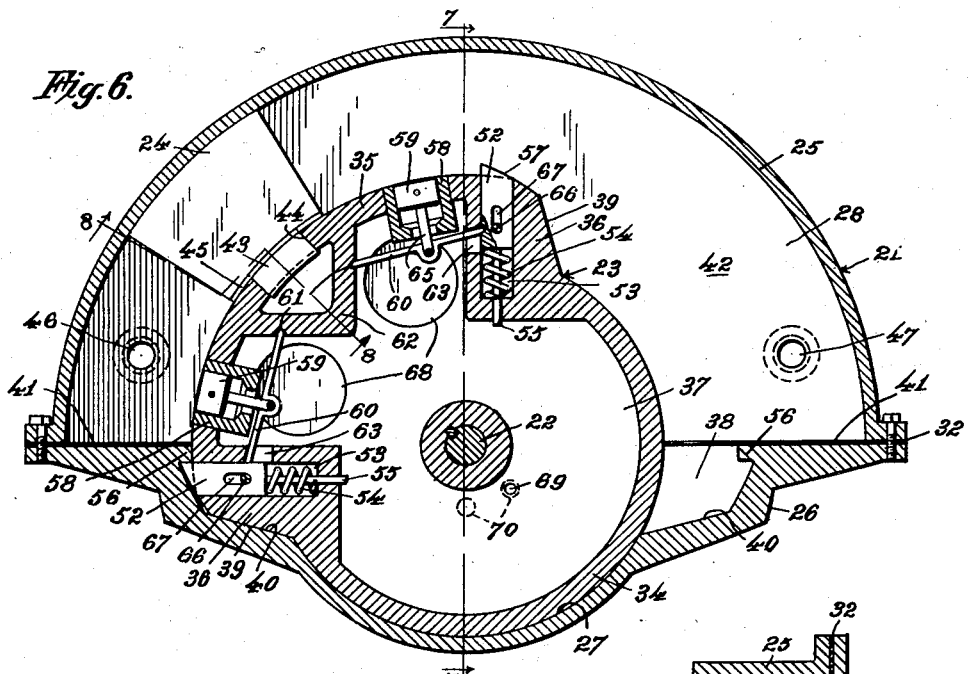
Figure 7:
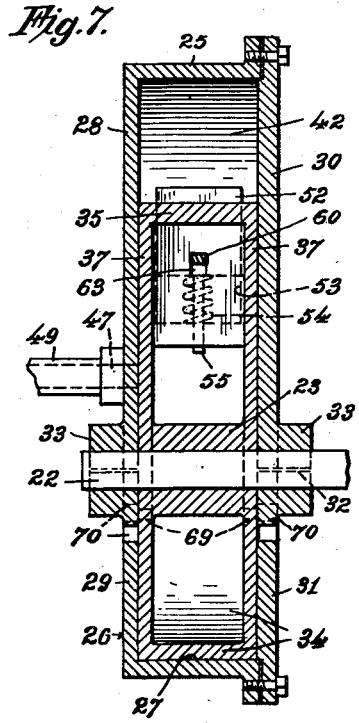
Figure 8:
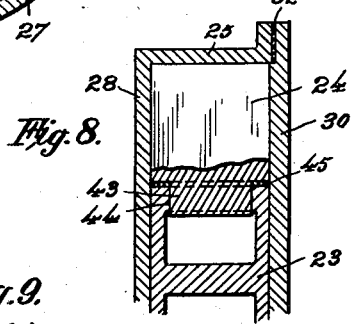
Figure 9:
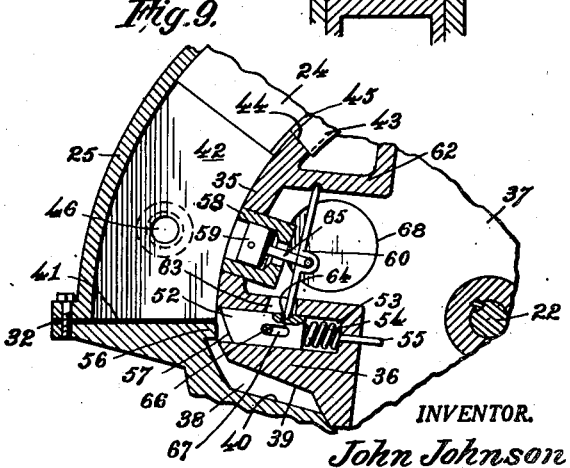

The invention will be more readily understood by reference to the accompanying drawings, forming a part of this application, and in which, Figure 1 is a side elevation of the actuating device or motor, per se, Figure 2 is a similar view of the opposite side thereof, Figure 3 is an edge elevation of the same, Figure 4 is a side elevation of the rotor or spider without the vane, Figure 5 is an edge elevation of the same, Figure 6 is a longitudinal section taken on substantially the line 6—6 of Figure 3, and illustrated upon an enlarged scale, Figure 7 is a transverse section on substantially the line 7—7 of Figure 6, Figure 8 is a detail section on the line 8—8 of Figure 6, Figure 9 is a detail section similar to Figure 6, and illustrating the unlocking of the spider, Figure 10 is a view of a modified form of the actuating device, the closure being removed, Figure 11 is a section on the line 11—11 of Figure 10 with the closure in place, Figure 12 is a plan view of the valve constituting a part of the invention, Figure 13 is an elevation thereof, Figure 14 is a plan view of the valve with the operating lever and closure plate removed, Figure 15 is a transverse section on the line 15—15 of Figure 12, Figure 16 is a plan view of the valve casing with the valve removed, Figure 17 is a detail section on the line 17—17 of Figure 15, Figure 18 is a similar view with the device arranged to actuate a retractable landing gear, Figure 19 is a diagram illustrating the device as illustrated in Figures 1 to 9 inclusive, together with the valve, as arranged to actuate a collapsible elbow, Figure 20 is a similar view illustrating the combination of the modified form of actuating device as shown in Figures 10 and 11, together with the valve, as used in operating an elevator or rudder, and Figure 21 is a detail diagrammatic view illustrating a modified connection between the shaft of the motor and the actuated element.

Referring to the drawings, Figures 1 to 9 inclusive illustrate the form of actuating device especially designed for use in conjunction with airplane landing gear, and/or for the collapsible elbows described in my copending application hereinbefore identified. As shown in said figures, the motor comprises a housing 21, a shaft 22, an oscillatory spider or rotor 23 keyed or otherwise secured to the shaft, a vane 24 on the spider and suitable inlet and exhaust ports hereinafter described.

The housing 21 is comparatively narrow or shallow and includes an upper semi-cylindrical portion 25, and a lower portion 26 having a relatively small semi-cylindrical seat 27 for the body of the rotor or spider. The portions 25 and 26 of the housing have side walls 28 and 29 integral therewith, respectively. Closure plates 30 and 31 secured to the portions 25 and 26 of the housing and to each other, with interposed air tight packing 32, complete the housing. The shaft 22 is mounted in bearings 33 concentric with the semi-cylindrical portions 26 and 27.

The spider 23 comprises a cylindrical portion 34 which fits within the seat 27 of the housing, a radial extension including an arcuate or cylindrical wall 35 of greater radius than the portion 34 and thicker walls 36 extending from the ends of the wall 35 to the adjacent ends of the portion 34, and parallel side walls 37 which are preferably integral therewith. The lower housing member 26 is recessed as at 38 to receive the portions 36 of the spider, and the outer faces 39 of said portions and the bottom faces 40 of said recesses 38 are similarly inclined to form a snug fit when in contact. The faces 40 also constitute stops to limit the throw of the spider in each direction. The upper faces 41 of lower portion 26 of the housing constitute the end walls of an arcuate air chamber 42 formed between the spider and the walls of the upper portion of the housing.

The vane 24 is arranged centrally of the wall 35 of the spider and is formed with a stem 43 fitting in a rectangular aperture 44 in said wall. The vane extends radially from the spider into contact with the semi-cylindrical wall 25 of the housing, and constitutes a piston within the air chamber 42 formed in the housing as above stated.

All of the contacting surfaces between the spider and vane, and the housing are milled and ground to an air tight fit. A resilient gasket 45 is located between the base of the vane 24 and the adjacent face of the spider, forming an air tight packing between the same and also yieldingly pressing the vane into contact with the wall 25. Also the packing 32 between the several elements of the housing are preferably formed of shims, so that the thickness thereof may be varied to assure air tight but free working contacts between the housing and the several parts of the spider and vane.

The wall 28 of the housing is provided with air ports 46 and 47 arranged adjacent the ends of the air chamber 42 and above the wall faces 41 which form the ends of said chamber. These ports are connected to a control valve, hereinafter described, by conduits or pipes 48 and 49 respectively and alternately constitute inlet and exhaust ports. Referring to Fig. 6, when air under pressure is admitted through the port 46, the spider will be rotated to the right, and the air will be exhausted through the port 47; and when the air is admitted through the port 47, the spider will be rotated to the left and the air on the opposite side of the vane will be exhausted through the port 46.

The form of the device above described is particularly designed for actuating the landing gear of an airplane, and/or the collapsible elbows above mentioned, as illustrated in Figs. 18 and 19 respectively, and for this purpose the rotation or throw of the spider should be 90°. In said figures 50 indicates a lever portion or strut of a landing gear, and 51 indicates a folding elbow.

As said landing gear and said elbows are maintained in either extended or folded position for a considerable length of time, means are provided for automatically locking the spider, and hence the shaft 22, in place at the end of each stroke of the same. To this end, each of the parts 36 of the spider is provided with a latch 52 arranged in a recess 53, and outwardly projected by a spring 54 arranged about a stem 55 on the latch. The outer end of the latch 52 normally projects beyond the periphery of the portion 35 of the spider to engage beneath a flange or keeper 56 at the upper outer edge of the recess 38, and is beveled in one direction only, as at 57, to facilitate passing said keeper at the end of the stroke but positively preventing rotation of the vane in the opposite direction until the latch is positively retracted. It will be noted, by reference to Figs. 6 and 9 of the drawing, that the latch cannot be retracted from beneath the keeper 56 by movement of the rotor. This is particularly important when the device is used in connection with landing gear, and/or with the collapsible air elbows 51.

Means are provided for automatically retracting the latch when the spider is to be moved, and this is accomplished by mechanism actuated by the pressure build-up when air is admitted to the chamber 42 for shifting the spider. For this purpose a cylinder 58 is arranged in the wall 35 of the spider adjacent each latch, and with their outer ends in open communication with the air chamber 42. These cylinders are secured in position, in any desired manner, as by a press fit, shrinkage, or welding; and are each provided with a piston 59.

Arranged transversely of the inner end of the cylinder is a lever 60 having one end pivotally mounted in a flared recess 61 in a wall 62 within the spider and the opposite end extending through an aperture 63 in the inner wall of the recess 53, into a flared socket 64 in the latch. A rod 65 connects the piston 59 to the lever 60; and a pin 66 extending through a slot 67 in the latch limits the movement of the latch in both directions. To facilitate assembling the latch mechanism, apertures 68 of ample size are provided in both of the side walls 37 of the spider. To avoid pressure build-up within the spider, which would interfere with proper actuation of the pistons 59, an air vent 69 is provided, preferably in each wall 37 of the spider, which communicates with vents 70 in the wall 29 and closure plate 26 of the housing when the spider is in either of its latched positions.

In Figs. 12 to 17 inclusive is illustrated the means for controlling the actuating mechanism above described. This comprises generally a valve casing consisting of a lower or valve chamber portion 71, an upper or air chamber portion 72, and a valve in the valve chamber, together with means for operating the valve. The valve chamber comprises a bottom wall 73 and a cylindrical side wall 74, and within said chamber is a valve disc 75, the upper face of which is in a plane below that of the upper edge of the side wall 74. The upper, air chamber portion 72 comprises an annular portion 76 which rests on the valve disc 75, and a central hollow cylindrical portion 77 closed at the top by a wall 78, forming the air chamber 79 which is constantly supplied with air under pressure through the inlet pipe 80. The annular portion 76 is provided with a flange 81 perforated to receive screws 82 for holding the housing members together, and between said flange and the upper edge of the wall 74 is a packing 83 which is preferably formed of shims, so that the pressure of the annular portion 76 on the valve disc may be adjusted to hold the disc securely seated on the bottom 73.

Extending axially of the housing is a post 84, the lower end of which is reduced in diameter as at 85 and seated in a bearing 86 in the bottom of the wall 73. The upper end of the post extends above the top wall 78 to receive the hub 87 of an operating lever 88. A bushing 89 is provided in the top wall 78 and has a flange 90 which fits snugly against the under face of the top, the contacting faces being ground to an air tight fit. The upper portion of the post has a flat face 91 which is engaged by flat portions 92 and 93 of the bores in the bushing 89 and hub 87 respectively, so that the bushing and post will turn with the lever 88.

A screw 94 is threaded into the upper end of the post 84 and has a flange 95 which bears upon the upper face of the hub 87 and draws the post, together with the bushing 89 upwardly, a shoulder 96 formed at the end of the flat face 91 engaging under the bushing, so that the hub 87 and bushing are securely clamped together. The lower portion of the post extends through the valve disc 75 and is provided with a flat face 97 above the reduced end, which engages a flat face 98 in the valve disc, keying said disc to the post with a sliding connection. By this arrangement, pressure within the air chamber 79 will force the flange 90 upwardly against the top 78, and the valve 75 downwardly against the wall 73 which constitutes the valve seat.

The bottom wall or valve seat 73 of the housing is provided with compressed air ports 99 and 100 equidistant radially from the center of the housing, and preferably 90° apart, and the valve disc is provided with a port 101 extending through the same, and which may be brought into register with the ports 99 or 100 at the option of the operator thereby connecting the air chamber 79 with the selected port. The port 99 is connected to one of the ports 46 or 47 of the actuating device, and the port 100 to the other of said ports, by means of the pipes 48 and 49.

Also at the same radical distance from the center of the valve chamber, as the ports 99 and 100, are a pair of exhaust ports 102 and 103; and the under face of the valve disc is formed with arcuate ducts 104 which are always in communication with said exhaust ports, and also with the adjacent ports 99 and 100 when the supply port 101 is in central or neutral position between said ports, so that pressure is relieved on both sides of the vane 24. When the valve is turned to bring the port 101 into register with either of the ports 99 or 100, the adjacent arcuate duct 104 is moved out of register with said port; but the duct on the opposite side maintains communication between the ports of its respective side, so that as the compressed air enters the air chamber 42 on one side of the vane 24 and moves the spider 23, the air on the other side of the vane will be exhausted through one of the control valve ports 102 or 103. Stop lugs 105 are provided on the valve housing to be engaged by a lug 106 on the lever 88 to assure proper register of the port 101 with the ports 99 and 100.

In Figs. 10, 11 and 20 is illustrated a modified form of the actuating device particularly adapted for operating the elevators and/or rudders of an airplane. For such use there is no need for the locking means for holding the spider and shaft in a fixed position as is obvious; and it is necessary that the spider have a greater angular throw, that is, substantially 180°, so as to move the rudder or elevator into position at right angles to, and to either side of the path of travel of the plane. In this form of the device the arcuate air chamber 42ª is approximately three quarters circular or 270° so that the throw of the spider 23ª and shaft 22 will be 180°, or 90° each side of the central or neutral position. In Fig. 20, the elevator or rudder 107 is illustrated in full lines at said central or neutral position, and in dotted lines in several operative positions, the positions X and Y indicating the limit of movement in the opposite directions.

The spider 23ª comprises a cylindrical body portion 108 of 270°, and a radial extension 109, of 90° upon which extension the vane 24 is mounted as in the form hereinbefore described. A short arcuate seat or bearing 110 is provided for the spider similar to the bearing 27 but of less extent peripherally. Radially disposed shoulders 111 are provided between the adjacent end of the portions 108 and 109 forming stops to engage the radially disposed ends 112 of the air chamber 42ª. In using this form of the device the same type of control valve is employed but just sufficient air is admitted to the air chamber 42ª to give the desired pitch to the rudder or the elevator so that they may be held at any angle balanced between the air pressure in the chamber and the exterior air pressure on the rudder or elevator.

In Figs. 18, 19 and 20 the shaft 22 is illustrated as keyed directly to the element to be actuated. However, this is not necessary as the shaft may be connected to the actuated element in various ways, such as by gearing as illustrated in Fig. 21. As shown therein the shaft 22 is connected to the element 113 by gears 114.

While I have illustrated and described my invention as particularly applied to airplanes, it will be obvious that the device may have other applications, and the claims should be interpreted with this in view.

I claim:

1. A system of the class described, comprising an element to be actuated, a housing, an oscillatory spider therein provided with a vane, a shaft fixed to said spider and operatively connected to said element to be actuated, means for limiting the movement of said spider and vane in each direction, a pair of ports in said housing arranged beyond the limits of movement of the vane respectively, a pair of latches carried by said spider for locking said spider to said housing upon reaching the end of its movement in either direction, a source of compressed air supply, a control device having a pair of ports in fixed communication with the ports in said housing respectively, means for optionally connecting either of the last named ports with the source of air supply to actuate said spider and to release the locked latch, and to simultaneously open the other of said ports to the exhaust air from said housing.

2. A system of the class described, comprising an element to be actuated, a housing, an oscillatory spider therein provided with a vane, a shaft fixed to said spider and operatively connected to said element to be actuated, means for limiting the movement of said spider and vane in each direction, a pair of ports in said housing arranged beyond the limits of movement of the vane respectively, means carried by said spider for locking said spider to said housing upon reaching the end of its movement in either direction, a source of compressed air supply, a control device having a pair of ports in fixed communication with the ports in said housing respectively, means for optionally connecting either of the last named ports with the source of air supply and to simultaneously open the other of said ports to the exhaust air from the housing, and means actuated by the pressure build-up behind the vane for retracting said locking means to release the spider.

3. In a pneumatic control system, an actuating device comprising a housing, an oscillatory spider therein provided with a vane, a shaft fixed to said spider, means for limiting the movement of said spider and vane in each direction, a pair of ports in said housing arranged beyond the limits of movement of said vane respectively, a pair of substantially radially movable latches arranged within said vane adjacent the opposite peripheral ends thereof for locking said spider to said housing upon reaching the end of its movement in either direction, a source of compressed air supply, means for optionally admitting air through either of said ports, and means actuated by the pressure build-up behind the vane for retracting said latches to release the spider.

4. In a pneumatic control system, an actuating device comprising a housing, an oscillatory spider therein, a shaft fixed to said spider, said spider including a cylindrical body portion and a radial extension, a vane on said extension, said housing having a cylindrical seat for said body portion of said spider and a cylindrical outer wall concentric with said shaft and engaged by the outer end of said vane, stops in said housing engaged by the ends of said extensions of the spider to limit the movement of the spider in either direction, a resiliently projected latch adjacent each end of said radial extension, keepers in said housing to be engaged by said latches at the end of the throw of said spider, said housing having an air port adjacent each of said stops and between the same and said vane, and means actuated by pressure build-up behind the vane for retracting the respective latch to release the spider.

5. In a pneumatic control system an actuating device comprising a housing, a shaft, a spider in said housing fixed to said shaft, said spider consisting of a cylindrical body portion, a radial extension including an arcuate outer wall and connecting walls between said arcuate walls and said body portion, a vane projecting from said arcuate wall, said housing having a cylindrical seat for said body portion of the spider and a cylindrical outer wall concentric therewith and forming with said spider an arcuate air chamber, stops in said housing engageable by said connecting walls, resiliently projected latches in said connecting walls, keepers in said housing engaged by said latches when said connecting walls engage said stops, said housing having an air port adjacent each of said stops, retracting means for each of said latches and comprising a cylinder in said extension adjacent the respective latch and open at its outer end to said air chamber, a piston in said cylinder, a lever pivotally mounted at one end in said spider and connected to said latch, and a connecting rod between said piston and said lever.

6. A device as set forth in claim 4 further characterized by means to prevent pressure build-up within the spider.

7. A device as set forth in claim 4 further characterized by an air vent in the side wall of said spider, and vents in the adjacent wall of the housing adapted to register alternately with the first said vent when the spider is at the opposite limits of movement.

JOHN JOHNSON.

REFERENCES CITED

The following references are of record in the file of this patent:

UNITED STATES PATENTS

| Number | Name | Date |
| --- | --- | --- |
| 949,372 | Heger | Feb. 15, 1910 |
| 1,897,075 | Samson | Feb. 14, 1933 |
| 2,055,739 | Wilhelm | Sept. 29, 1936 |
| 2,057,317 | Ruud | Oct. 13, 1936 |
| 2,258,376 | Clothier | Oct. 7, 1941 |
| 2,304,894 | Dilworth | Dec. 15, 1942 |
| 2,327,064 | Rappl | Aug. 17, 1943 |
| 2,350,066 | Parker | May 30, 1944 |
| 2,389,232 | Conlon | Nov. 20, 1945 |